United States Patent
Myers et al.

(10) Patent No.: US 12,203,659 B2
(45) Date of Patent: Jan. 21, 2025

(54) COMBUSTOR CYLINDER, COMBUSTOR, AND GAS TURBINE

(71) Applicant: MITSUBISHI HEAVY INDUSTRIES, LTD., Tokyo (JP)

(72) Inventors: Geoffrey D. Myers, Houston, TX (US); Kenji Miyamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/229,968

(22) Filed: Aug. 3, 2023

(65) Prior Publication Data
US 2024/0133554 A1 Apr. 25, 2024
US 2024/0230092 A9 Jul. 11, 2024

Related U.S. Application Data

(60) Provisional application No. 63/400,539, filed on Aug. 24, 2022.

(51) Int. Cl.
*F23R 3/28* (2006.01)
*F02C 3/04* (2006.01)

(52) U.S. Cl.
CPC ............... *F23R 3/28* (2013.01); *F02C 3/04* (2013.01); *F05D 2260/232* (2013.01)

(58) Field of Classification Search
CPC .. F23R 3/346; F23R 3/286; F23R 3/34; F23R 3/283; F23R 3/28; F23R 3/005; F23R 3/46; F23R 3/06; F02C 3/04; F05D 2260/232; F01D 9/023
See application file for complete search history.

(56) References Cited

U.S. PATENT DOCUMENTS

| | | | | |
|---|---|---|---|---|
| 5,749,219 A | * | 5/1998 | DuBell | F23R 3/346 60/737 |
| 2011/0146284 A1 | | 6/2011 | Morimoto et al. | |
| 2013/0098063 A1 | | 4/2013 | Mizukami et al. | |

(Continued)

FOREIGN PATENT DOCUMENTS

| | | |
|---|---|---|
| JP | 2010-261318 A | 11/2010 |
| JP | 2012-077660 A | 4/2012 |

(Continued)

*Primary Examiner* — Jason H Duger
(74) *Attorney, Agent, or Firm* — WHDA, LLP

(57) ABSTRACT

A combustor cylinder includes a cylinder, and a fuel nozzle capable of injecting fuel into a combustion space of the cylinder. The cylinder has a plurality of cooling passages allowing cooling air to circulate therethrough, and a nozzle attachment penetration hole penetrating the cylinder from an outer circumferential surface of the cylinder to an inner circumferential surface of the cylinder. The fuel nozzle has a mixing passage, a fuel passage communicating with the mixing passage and capable of supplying the fuel to the inside of the mixing passage, and a connection passage communicating with the mixing passage and capable of supplying cooling air from a part of the plurality of cooling passages to the inside of the mixing passage. A position in the mixing passage communicating with the connection passage is on a side where a spout port of the mixing passage is present from a position where the mixing passage communicates with the fuel passage.

11 Claims, 7 Drawing Sheets

(56) References Cited

U.S. PATENT DOCUMENTS

| | | | |
|---|---|---|---|
| 2013/0174558 A1* | 7/2013 | Stryapunin | F23R 3/002 60/734 |
| 2013/0298563 A1 | 11/2013 | Haynes et al. | |
| 2016/0047317 A1* | 2/2016 | Willis | F02C 7/22 60/740 |
| 2017/0268785 A1* | 9/2017 | Crawley | F23R 3/002 |
| 2018/0039254 A1 | 2/2018 | North et al. | |
| 2019/0226680 A1 | 7/2019 | North et al. | |
| 2019/0301738 A1* | 10/2019 | North | F23R 3/286 |

FOREIGN PATENT DOCUMENTS

| | | |
|---|---|---|
| JP | 2013-238387 A | 11/2013 |
| WO | 2023-218777 A1 | 11/2023 |

* cited by examiner

COMBUSTOR CYLINDER, COMBUSTOR, AND GAS TURBINE

BACKGROUND OF THE INVENTION

Field of the Invention

The present disclosure relates to a combustor cylinder allowing fuel to combust therein on an inner circumferential side, a combustor having this combustor cylinder, and a gas turbine having this combustor.

Priority is claimed on United States Patent Application, Publication No. 63/400,539, filed provisionally in the United States on Aug. 24, 2022, the content of which is incorporated herein by reference.

Description of Related Art

A gas turbine includes a compressor compressing air, a combustor generating combustion gas by causing fuel to combust using air compressed by the compressor, and a turbine driven by means of combustion gas from the combustor.

A combustor has a cylinder (a combustor liner or a transition piece) allowing fuel to combust therein. Since an inner circumferential surface of this cylinder is exposed to high-temperature combustion gas, the temperature thereof becomes extremely high. Hence, in the technology according to the following Patent Document 1, a plurality of cooling passages extending in a uniform direction are formed between an inner circumferential surface and an outer circumferential surface of a cylinder, and a cooling medium flows therethrough.

In addition, a combustor according to the following Patent Document 2 has a cylinder allowing fuel to combust therein, and a plurality of nozzles injecting fuel into this cylinder. The cylinder has a tubular shape around a combustor axis. Here, for the sake of convenience of the following description, a direction in which a combustor axis extends will be referred to as an axial direction. One side of both sides in this axial direction will be referred to as a base end side, and the other side thereof will be referred to as a tip side. The nozzles include a primary fuel nozzle and a secondary fuel nozzle. The primary fuel nozzle is disposed on the base end side of the cylinder and injects primary fuel into the cylinder toward the tip side. The secondary fuel nozzle is attached to the cylinder at a position on the tip side from the primary fuel nozzle and injects secondary fuel into the cylinder toward a radially inward side.

PATENT DOCUMENTS

[Patent Document 1] Japanese Unexamined Patent Application, First Publication No. 2010-261318
[Patent Document 2] Japanese Unexamined Patent Application, First Publication No. 2013-238387

SUMMARY OF THE INVENTION

In the foregoing Patent Document 2, since the secondary fuel from the secondary fuel nozzle is spouted into the cylinder in which the primary fuel is combusting, there is a probability of occurrence of a flashback phenomenon in which the secondary fuel ignites inside the secondary fuel nozzle. If a flashback phenomenon occurs, there is concern that the secondary fuel nozzle may be damaged. For this reason, it is desired to curb occurrence of a flashback phenomenon.

Hence, an object of the present disclosure is to provide a combustor cylinder capable of curbing occurrence of a flashback phenomenon in which fuel ignites inside a fuel nozzle, a combustor having this combustor cylinder, and a gas turbine having this combustor.

Regarding an aspect according to the present disclosure for achieving the foregoing object, a combustor cylinder includes a cylinder that has a tubular shape around an axis and forms a combustion space allowing fuel to combust therein on an inner circumferential side, and a fuel nozzle that is attached to the cylinder and is capable of injecting fuel into the combustion space in a direction having a directional component to a radially inward side with respect to the axis. The cylinder has an inner circumferential surface defining an edge of the combustion space on a radially outward side with respect to the axis, an outer circumferential surface having a back-to-back relationship with the inner circumferential surface, a plurality of cooling passages formed between the inner circumferential surface and the outer circumferential surface and allowing cooling air to circulate therethrough, a nozzle attachment penetration hole penetrating the cylinder from the outer circumferential surface to the inner circumferential surface, and a nozzle surrounding passage formed along an edge of the nozzle attachment penetration hole around the nozzle attachment penetration hole and allowing the cooling air to circulate therethrough. At least a part of the plurality of cooling passages communicates with the nozzle surrounding passage. The fuel nozzle is attached to the cylinder while at least a part of the fuel nozzle is inserted through the nozzle attachment penetration hole. The fuel nozzle has a mixing passage, a fuel passage communicating with the mixing passage and capable of supplying the fuel to the inside of the mixing passage, and a connection passage communicating with the nozzle surrounding passage and the mixing passage of the cylinder and capable of supplying cooling air from the nozzle surrounding passage to the inside of the mixing passage. The mixing passage extends in a direction having a component of a radial direction with respect to the axis and has a spout port capable of spouting the fuel into the combustion space. A position in the mixing passage communicating with the connection passage is on a side where the spout port is present from a position where the mixing passage communicates with the fuel passage.

Fuel which has flowed into the mixing passage is spouted to the combustion space inside the cylinder from the spout port of the mixing passage. The flow velocity distribution within a cross section of the mixing passage related to a fluid flowing inside this mixing passage is not uniform. At the center of the cross section of the mixing passage, the flow velocity becomes the highest in this cross section. On the other hand, the flow velocity inside the mixing passage and in the vicinity of a wall surface defining the mixing passage is almost zero. For this reason, even if a fuel concentration distribution within the cross section of the mixing passage is uniform, there is a probability that fuel present in the vicinity of the wall surface defining the mixing passage inside the mixing passage will ignite due to an influence of flames or heat inside the combustion space of the cylinder. Namely, there is a probability of occurrence of a flashback phenomenon.

In the present aspect, on a side where the spout port of the mixing passage is present from a position where fuel is supplied to the inside of the mixing passage, cooling air which has passed through the cooling passage of the cylinder is supplied through the connection passage. For this reason, in the present aspect, the concentration of fuel on aside where the spout port of the mixing passage is present from a position where fuel is supplied to the inside of the mixing passage and in the vicinity of the wall surface defining the mixing passage inside the mixing passage decreases. Therefore, in the present aspect, occurrence of a flashback phenomenon in which fuel ignites inside the mixing passage can be curbed.

Regarding another aspect according to the present disclosure for achieving the foregoing object, a combustor includes the combustor cylinder according to the aspect, and a primary fuel nozzle that is capable of injecting primary fuel in a direction having a directional component to a tip side of the tip side and a base end side in an axial direction along the axis inside the cylinder. The fuel nozzle of the combustor cylinder is a secondary fuel nozzle capable of injecting secondary fuel.

Regarding another aspect according to the present disclosure for achieving the foregoing object, a gas turbine includes the combustor according to the aspect, a compressor that is able to generate compressed air used for combustion of fuel inside the cylinder by compressing air, and a turbine that is able to be driven by means of combustion gas generated due to combustion of fuel inside the cylinder.

According to an aspect of the present disclosure, it is possible to curb occurrence of a flashback phenomenon in which fuel ignites inside a fuel nozzle.

DETAILED DESCRIPTION OF THE INVENTION

Hereinafter, an embodiment of a combustor including a combustor cylinder according to the present disclosure and a gas turbine facility including the combustor, and a modification example of the combustor cylinder will be described in detail with reference to the drawings.

Embodiment of Gas Turbine Facility

An embodiment of the gas turbine facility will be described with reference to FIG. 1.

Figure 1:
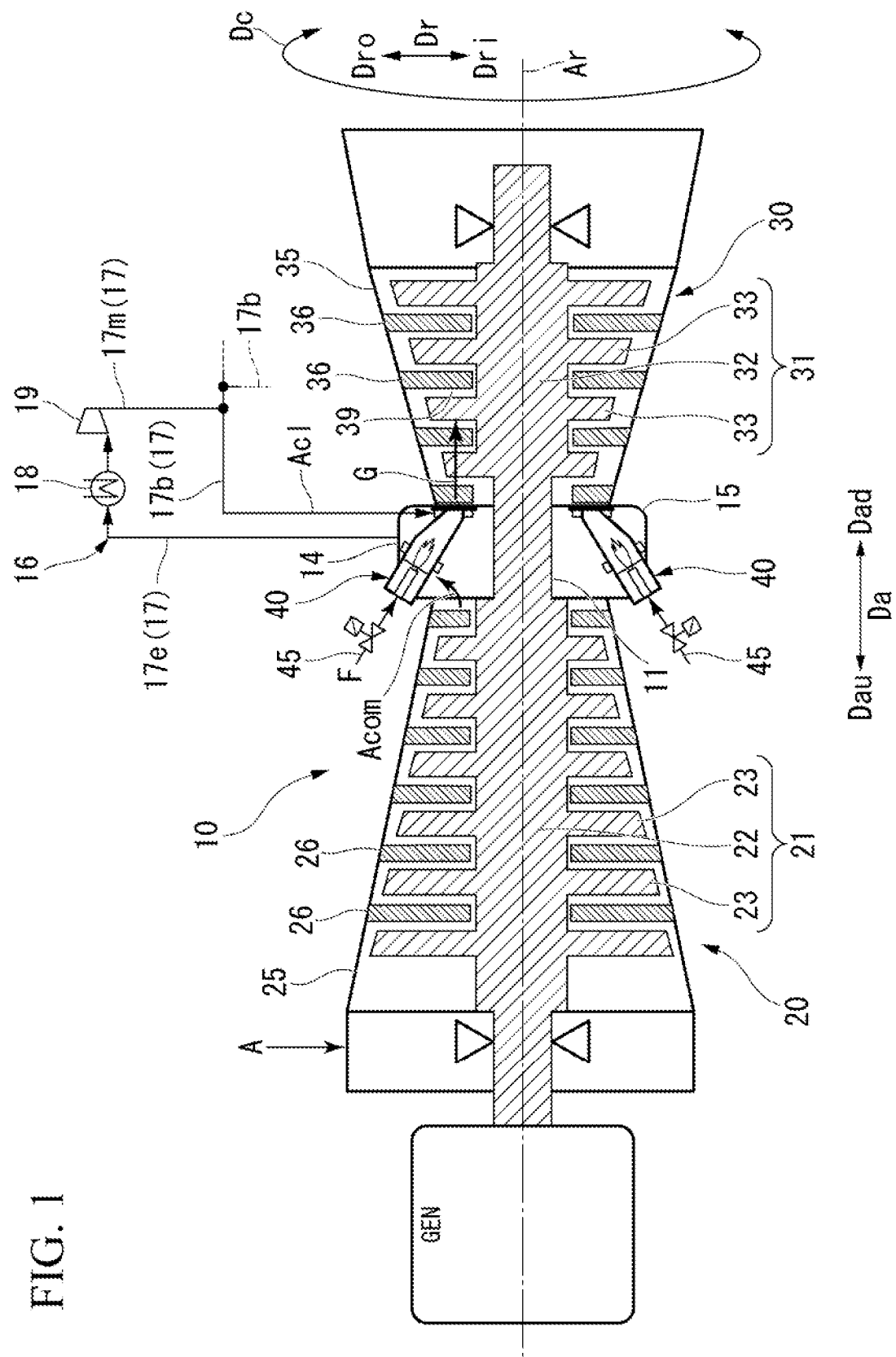
FIG. 1 is a schematic view illustrating the constitution of a gas turbine in an embodiment according to the present disclosure.

As illustrated in FIG. 1, the gas turbine facility according to the present embodiment includes a gas turbine and a forced cooling facility 16.

The gas turbine includes a compressor 20 that can generate compressed air Acom by compressing outside air A, a plurality of combustors 40 that can generate combustion gas G by causing fuel F to combust in the compressed air Acom, and a turbine 30 that can be driven by means of the combustion gas G.

The compressor 20 has a compressor rotor 21 rotating about a rotor axis Ar, a compressor casing 25 covering the compressor rotor 21, and a plurality of turbine vane cascades 26. The turbine 30 has a turbine rotor 31 rotating about the rotor axis Ar, a turbine casing 35 covering the turbine rotor 31, and a plurality of turbine vane cascades 36. Hereinafter, a direction in which the rotor axis Ar extends will be referred to as a rotor axis direction Da, one side of both sides in this rotor axis direction Da will be referred to as an axis upstream side Dau, and the other side thereof will be referred to as an axis downstream side Dad.

The compressor 20 is disposed on the axis upstream side Dau with respect to the turbine 30. The compressor rotor 21 and the turbine rotor 31 are positioned on the same rotor axis Ar are connected to each other, and constitute a gas turbine rotor 11. For example, a rotor of a generator GEN is connected to this gas turbine rotor 11. The gas turbine further includes an intermediate casing 14 disposed between the compressor casing 25 and the turbine casing 35. The compressed air Acom from the compressor 20 flows into this intermediate casing 14. The plurality of combustors 40 are arranged in a circumferential direction with respect to the rotor axis Ar and are attached to the intermediate casing 14. The compressor casing 25, the intermediate casing 14, and the turbine casing 35 are connected to each other and constitute a gas turbine casing 15.

The compressor rotor 21 has a rotor shaft 22 about the rotor axis Ar extending in the rotor axis direction Da, and a plurality of turbine blade cascades 23 attached to this rotor shaft 22. The plurality of turbine blade cascades 23 are arranged in the rotor axis direction Da. Each of the turbine blade cascades 23 is constituted of a plurality of turbine blades arranged in the circumferential direction with respect to the rotor axis Ar. Any one turbine vane cascade 26 of the plurality of turbine vane cascades 26 is disposed on the axis downstream side Dad of each of the plurality of turbine blade cascades 23. Each of the turbine vane cascades 26 is provided on an inward side of the compressor casing 25. Each of the turbine vane cascades 26 is constituted of a plurality of turbine vanes arranged in the circumferential direction with respect to the rotor axis Ar.

The turbine rotor 31 has a rotor shaft 32 extending in the rotor axis direction Da about the rotor axis Ar, and a plurality of turbine blade cascades 33 attached to this rotor shaft 32. The plurality of turbine blade cascades 33 are arranged in the rotor axis direction Da. Each of the turbine blade cascades 33 is constituted of a plurality of turbine blades arranged in the circumferential direction with respect to the rotor axis Ar. Any one turbine vane cascade 36 of the plurality of turbine vane cascades 36 is disposed on the axis upstream side Dau of each of the plurality of turbine blade cascades 33. Each of the turbine vane cascades 36 is provided on the inward side of the turbine casing 35. Each of the turbine vane cascades 36 is constituted of a plurality of turbine vanes arranged in the circumferential direction with respect to the rotor axis Ar. In a circular space between an inner circumferential side of the turbine casing 35 and an outer circumferential side of the rotor shaft 32, a region in which the plurality of turbine vane cascades 36 and the plurality of turbine blade cascades 33 are disposed forms a combustion gas flow channel 39 in which the combustion gas G from the combustor flows.

A fuel line 45 is connected to each of the combustors 40. The combustor 40 can generate the combustion gas G by causing the fuel F from the fuel line 45 to combust in the compressed air Acom from the compressor 20.

The forced cooling facility 16 is a facility sending forced cooling air Acl to high-temperature components of the combustor exposed to the high-temperature combustion gas G in the components constituting the gas turbine. This forced cooling facility 16 has a cooling air line 17, a cooler 18, and a boost compressor 19. The cooling air line 17 is a line capable of bleeding the compressed air Acom inside the intermediate casing 14 from the inside of this intermediate casing 14 and guiding this compressed air Acom to the high-temperature components. The cooling air line 17 has a bleeding line 17e, a cooling air main line 17m, and a plurality of cooling air branch lines 17b. The bleeding line 17e is connected to the intermediate casing 14 and guides the compressed air Acom inside the intermediate casing 14 to the boost compressor 19. The cooler 18 is provided in the bleeding line 17e and can cool the compressed air Acom flowing in this bleeding line 17e. The boost compressor 19 boosts the compressed air Acom cooled by the cooler 18 and sends this compressed air Acom to the high-temperature components as the forced cooling air A. The cooling air main line 17m is connected to a discharge port of the boost compressor 19. The forced cooling air Acl that is air boosted by the boost compressor 19 flows in this cooling air main line 17m. The cooling air branch lines 17b are lines branching from the cooling air main line 17m for each of the plurality of high-temperature components. Each of the plurality of cooling air branch lines 17b guides the forced cooling air Acl to any one of the high-temperature components.

Embodiment of Combustor Cylinder and Combustor Having this Combustor Cylinder

An embodiment of the combustor cylinder and the combustor having this combustor cylinder will be described with reference to FIGS. 2 to 6.

Figure 2:
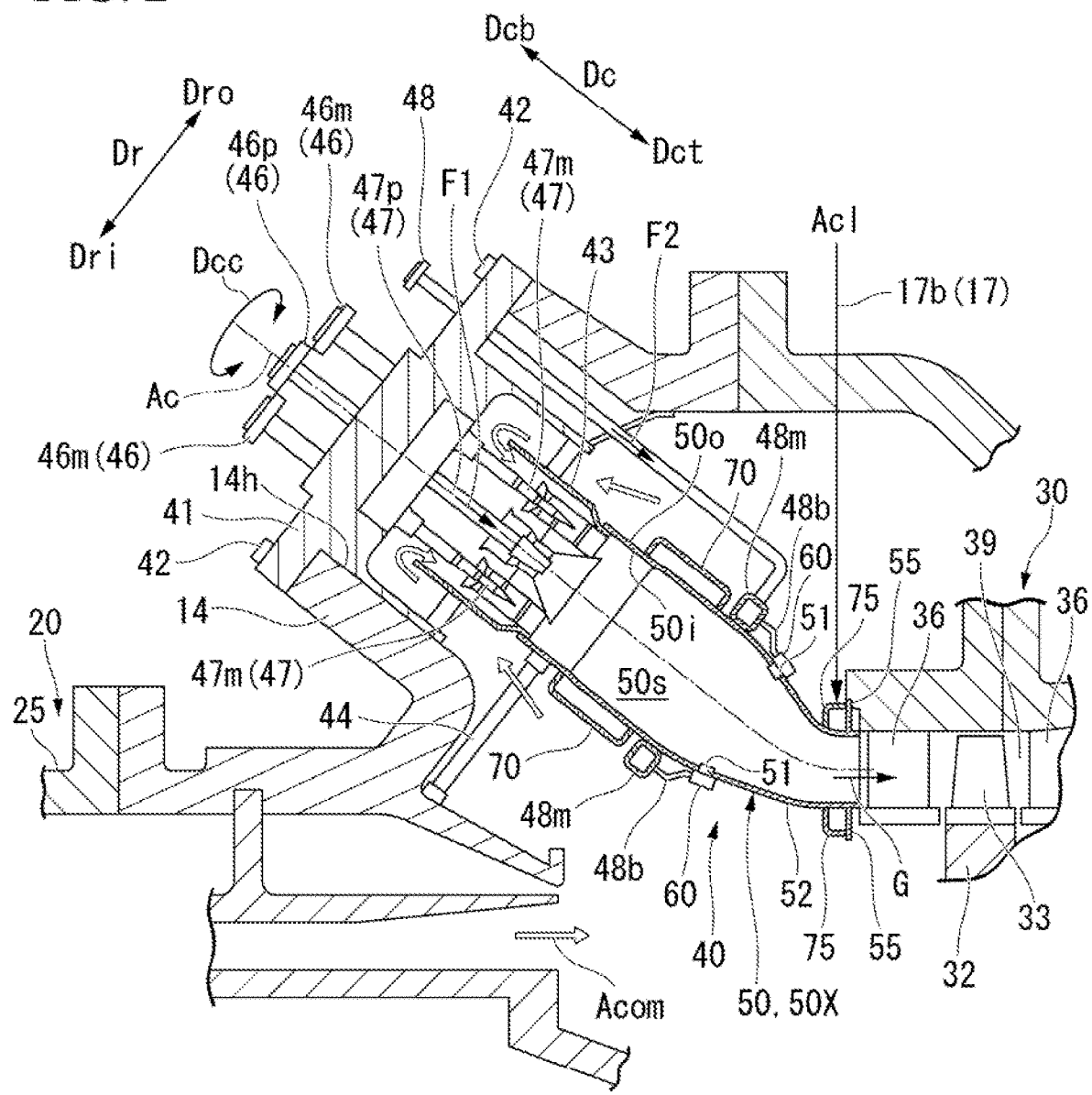
FIG. 2 is a cross-sectional view around a combustor of the gas turbine in the embodiment according to the present disclosure.

As illustrated in FIG. 2, the combustor 40 according to the present embodiment includes a flange 41, a combustor basket 43, a combustor cylinder (a combustor liner or a transition piece) 50, a plurality of primary fuel pipings 46, a plurality of primary fuel nozzles 47, a secondary fuel piping 48, branch secondary fuel pipings 48b, a fuel manifold 48m, an acoustic attenuator 70, and a cooling air jacket 75.

The flange 41 expands in a radiation direction from a combustor axis Ac. Both the combustor basket 43 and the combustor cylinder 50 are disposed inside the intermediate casing 14. In addition, both the combustor basket 43 and the combustor cylinder 50 have a tubular shape around the combustor axis Ac. Here, for the sake of convenience of the following description, a direction in which the combustor axis (which will hereinafter be simply referred to as an axis) Ac extends will be referred to as an axial direction Dc. One side of both sides in this axial direction Dc will be referred to as a tip side Dct, and the other side thereof will be referred to as a base end side Dcb. The tip side Dct is the axis downstream side Dad in the rotor axis direction Da, and the base end side Dcb is the axis upstream side Dau in the rotor axis direction Da. In addition, the axis Ac tilts with respect to the rotor axis Ar in a manner of approaching the rotor axis Ar toward the tip side Dct. The circumferential direction with respect to the axis Ac will be simply referred to as a circumferential direction Dcc. In addition, a radial direction with respect to the axis Ac will be simply referred to as a radial direction Dr. A side approaching the axis Ac in this radial direction Dr will be referred to as a radially inward side Dri, and a side opposite to this radially inward side Dri will be referred to as a radially outward side Dro.

A combustor attachment hole 14h penetrating the intermediate casing 14 from the outside of this intermediate casing 14 to the inside of the intermediate casing 14 is formed in the intermediate casing 14. The flange 41 is attached to the intermediate casing 14 using bolts 42 such that this combustor attachment hole 14h is blocked. The combustor basket 43 is attached to the flange 41. The plurality of primary fuel nozzles 47 are disposed on the inner circumferential side of this combustor basket 43. The combustor cylinder 50 is connected to a part of the combustor basket 43 on the tip side Dct with a seal member or the like therebetween. The combustor cylinder 50 is supported by a cylinder support 44 or the like fixed to an inner surface of the intermediate casing 14.

The combustor cylinder 50 has a tubular cylinder 50X around the combustor axis Ac, and a plurality of secondary fuel nozzles 60 attached to this cylinder 50X. The inner circumferential side of the cylinder 50X forms a combustion space 50s allowing fuel to combust therein. The plurality of secondary fuel nozzles 60 can inject secondary fuel F2 into the combustion space 50s in a direction having a directional component to the radially inward side Dri.

Each of the plurality of primary fuel nozzles 47 extends in the axial direction Dc. Each of the plurality of primary fuel nozzles 47 can inject primary fuel F1 in a direction having a directional component to the tip side Dct. Each of the plurality of primary fuel nozzles 47 is fixed to the flange 41. One nozzle of the plurality of primary fuel nozzles 47 is a pilot nozzle 47p, and the plurality of other nozzles are main nozzles 47m. The pilot nozzle 47p is disposed on the axis Ac. The plurality of main nozzles 47m are arranged in the circumferential direction Dcc around the pilot nozzle 47p.

Each of the plurality of primary fuel pipings 46 is a piping branching from the fuel line 45 and is fixed to the flange 41. One primary fuel piping 46 of the plurality of primary fuel pipings 46 is a pilot fuel piping 46p, and the plurality of other primary fuel pipings 46 are main fuel pipings 46m. The pilot fuel piping 46p is connected to the pilot nozzle 47p. Each of the plurality of main fuel pipings 46m is connected to any one main nozzle 47m of the plurality of main nozzles 47m.

The plurality of secondary fuel nozzles 60 described above are arranged in the circumferential direction Dcc and are attached to the cylinder 50X at positions on the tip side Dct from the plurality of primary fuel nozzles 47.

The fuel manifold 48m is disposed on the outer circumferential side of the cylinder 50X, on the tip side Dct from the primary fuel nozzle 47, and on the base end side Dcb from the secondary fuel nozzles 60. The fuel manifold 48m is formed to have a circular shape with respect to the axis Ac. The fuel manifold 48m has a circular shape with respect to the axis Ac and forms a fuel space in which the secondary fuel F2 can be temporarily stored. The secondary fuel piping 48 described above is connected to this fuel manifold 48m. This secondary fuel piping 48 is also a piping branching from the fuel line 45 and is fixed to the flange 41. The fuel manifold 48m and the plurality of secondary fuel nozzles 60 are connected to each other through a plurality of branch secondary fuel pipings 48b. Thus, the fuel manifold 48m communicates with the plurality of secondary fuel nozzles 60 through the plurality of branch secondary fuel pipings 48b such that the secondary fuel F2 inside the fuel space can be supplied to the plurality of secondary fuel nozzles 60.

Figure 4:
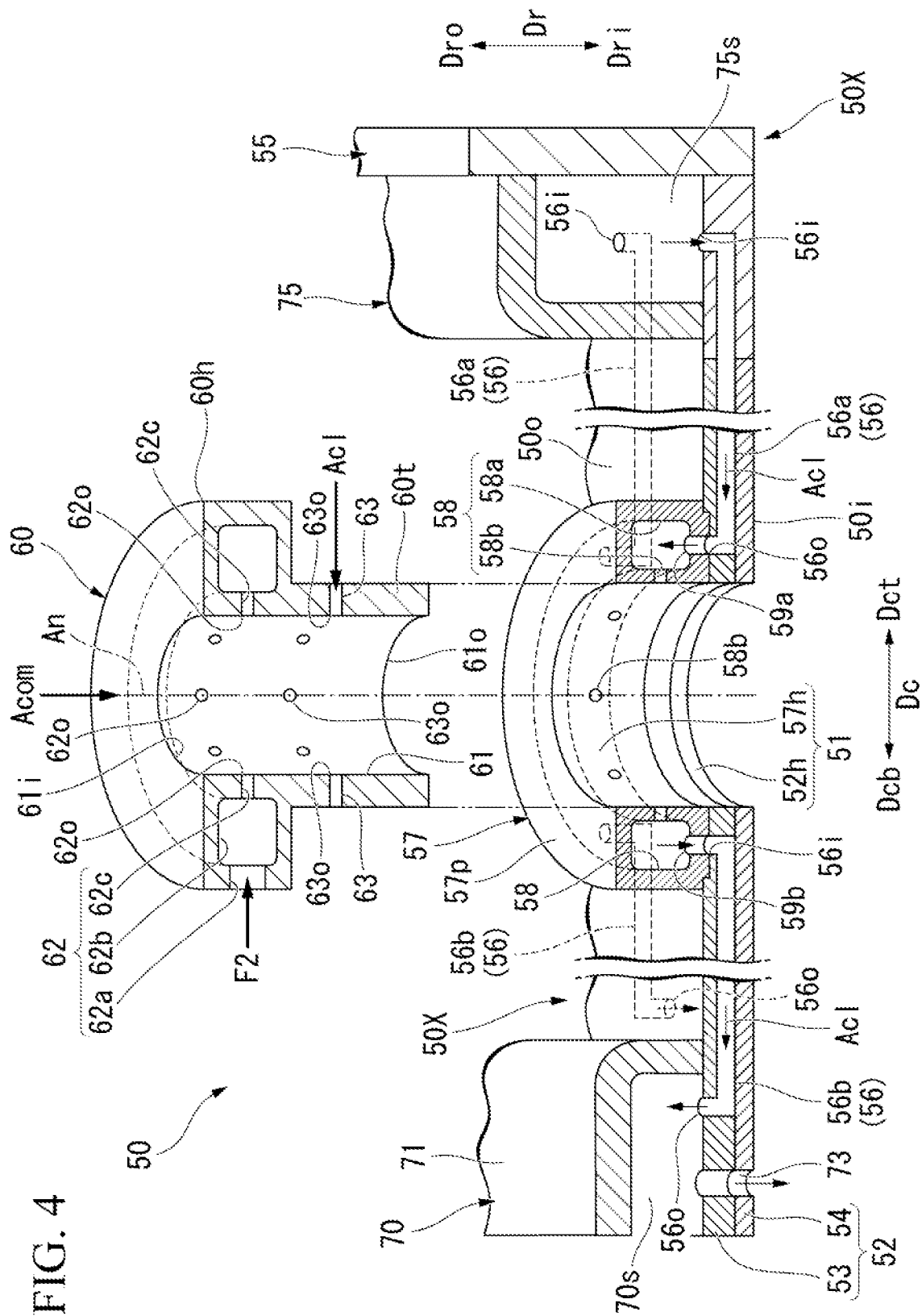
FIG. 4 is a perspective view of a main portion of a combustor cylinder cut along line IV-IV in FIG. 3.

As illustrated in FIGS. 2 and 4, the cylinder 50X has an inner circumferential surface 50i defining an edge of the combustion space 50s on the radially outward side Dro allowing fuel to combust therein, an outer circumferential surface 50o having a back-to-back relationship with the inner circumferential surface 50i, and a nozzle attachment penetration hole 51 penetrating the cylinder 50X from the outer circumferential surface 50o to the inner circumferential surface 50i. This cylinder 50X is constituted to have a tubular cylinder main body 52 around the axis Ac, and an outlet flange 55. The inner circumferential side of the cylinder main body 52 forms the combustion space 50s described above. The outlet flange 55 is provided at an end of the cylinder main body 52 on the tip side Dct. This outlet flange 55 extends from the end of the cylinder main body 52 on the tip side Dct toward the radially outward side Dro.

The acoustic attenuator 70 has an acoustic cover 71 forming an acoustic space 70s on the outer circumferential side of the cylinder main body 52 together with a part of a plate forming the cylinder main body 52. This acoustic cover 71 is provided in a circular shape with respect to the axis Ac at a part of the cylinder main body 52 on the base end side Deb. Acoustic holes 73 penetrating the acoustic cover 71 from the outer circumferential side of the cylinder main body 52 toward the inner circumferential side is formed in the part of the plate forming the cylinder main body 52.

The cooling air jacket 75 is a cover forming a cooling air space 75s on the outer circumferential side of the cylinder main body 52 together with the part of the plate forming the cylinder main body 52 and the outlet flange 55. This cooling air jacket 75 is provided in a circular shape with respect to the axis Ac on the outer circumferential side of the cylinder main body 52. The cooling air branch lines 17b described above using FIG. 1 are connected to this cooling air jacket 75. Thus, the forced cooling air Acl from the forced cooling facility 16 flows into the cooling air space 75s inside this cooling air jacket 75.

Figure 3:
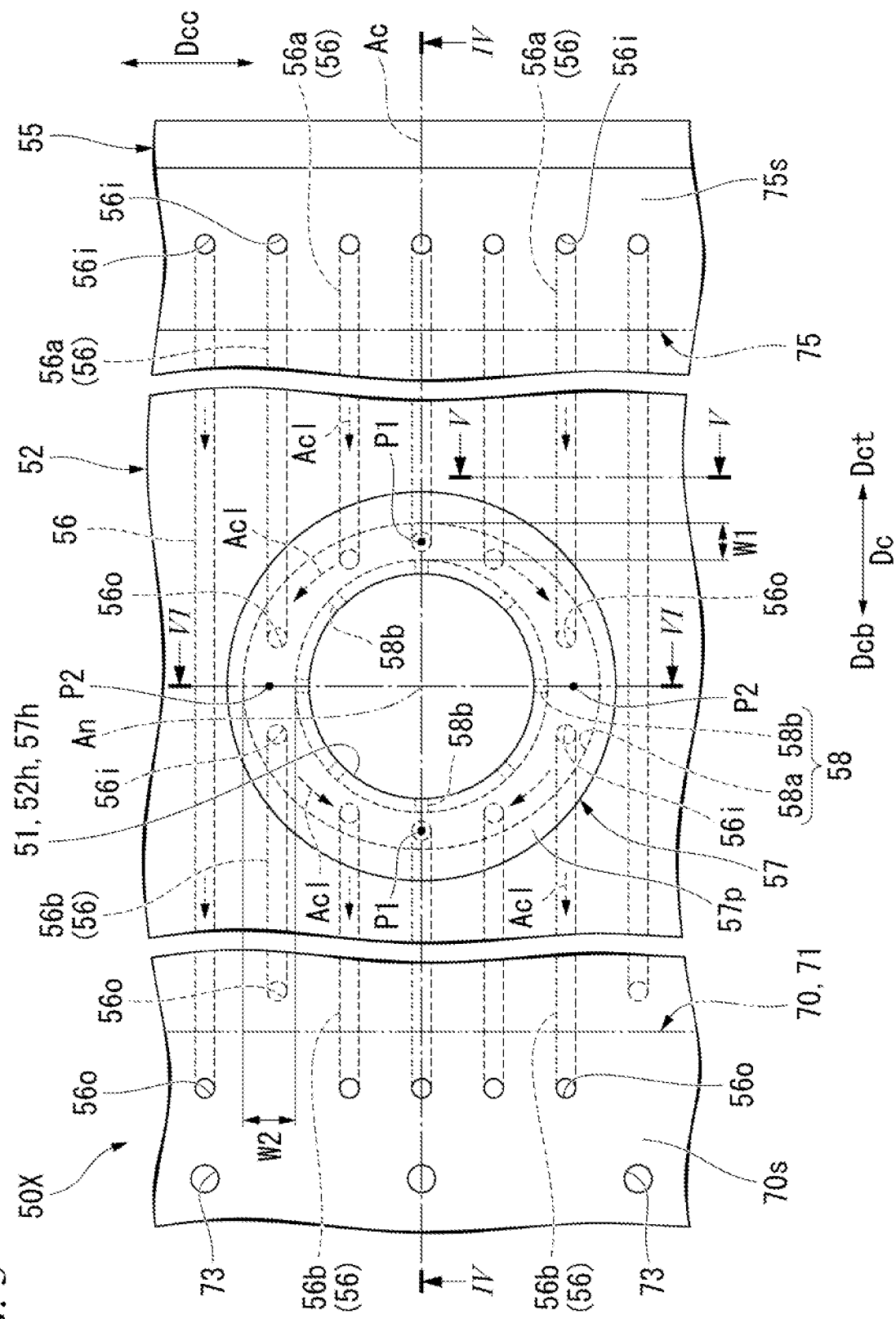
FIG. 3 is a plan view of a main portion of a cylinder in the embodiment according to the present disclosure.
Figure 5:
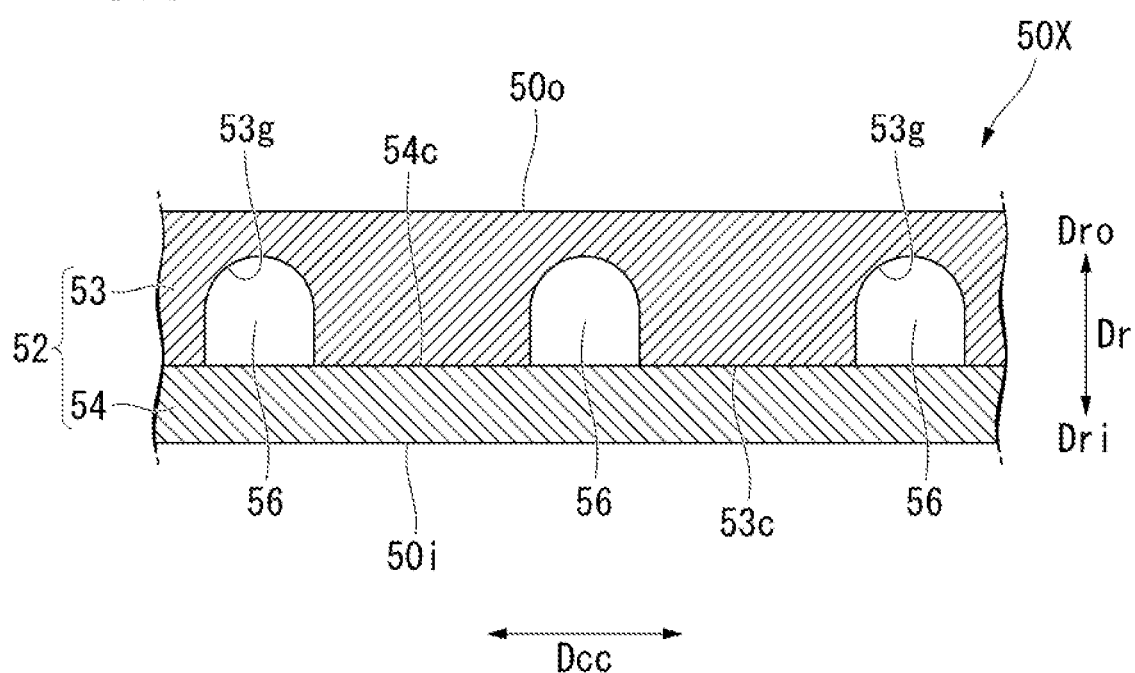
FIG. 5 is a cross-sectional view along line V-V in FIG. 3.
Figure 6:
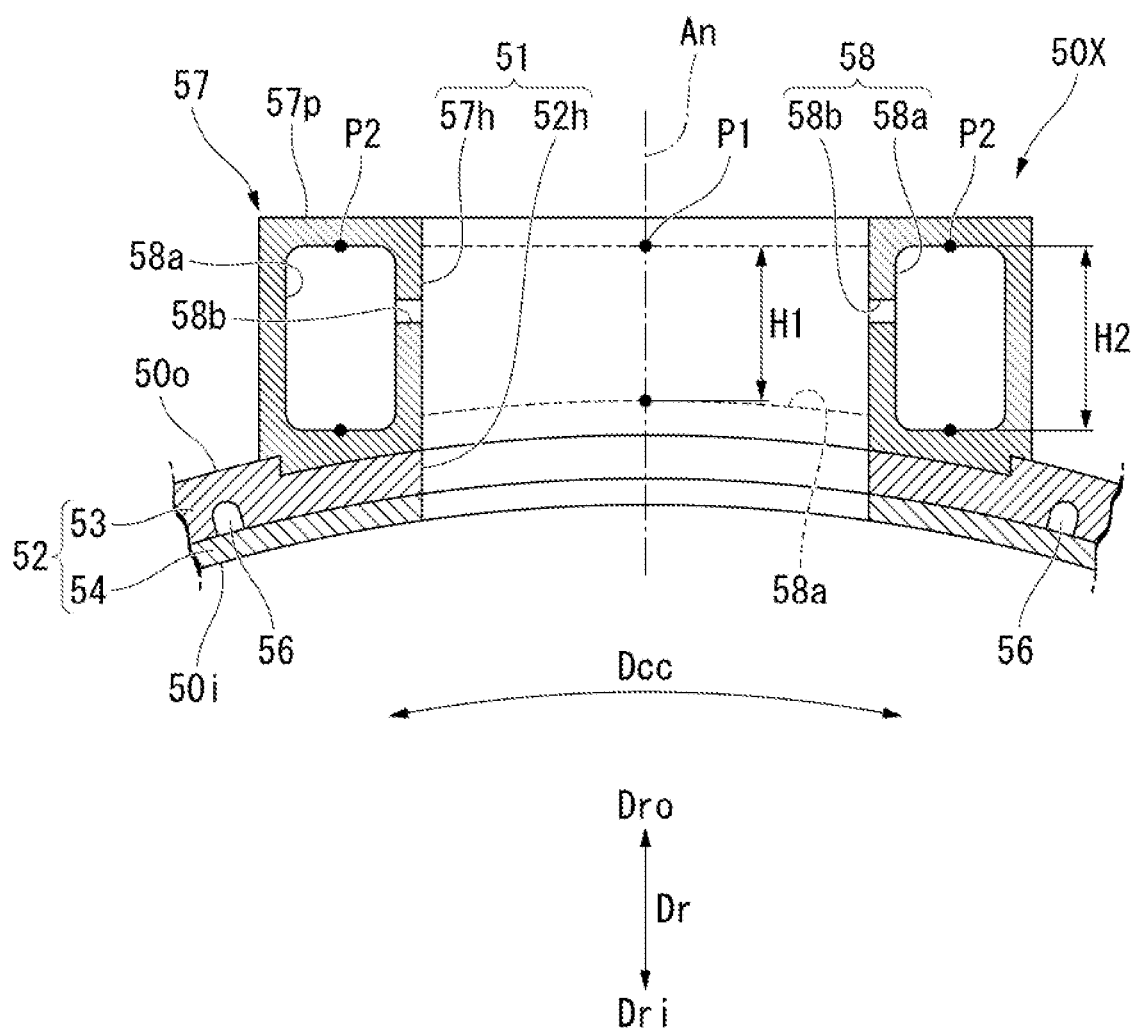
FIG. 6 is a cross-sectional view along line VI-VI in FIG. 3.

As illustrated in FIGS. 3 to 6, the nozzle attachment penetration hole 51 of the cylinder 50X is formed to have a colunmar shape about a nozzle axis An extending in the radial direction Dr with respect to the axis Ac. This nozzle attachment penetration hole 51 is formed between the acoustic attenuator 70 and the cooling air jacket 75 in the axial direction Dc. FIG. 3 is a plan view of a main portion of the cylinder 50X when the cylinder 50X is viewed from the radially outward side Dro. FIG. 4 is a perspective view of a main portion of the combustor cylinder 50 cut along line IV-IV in FIG. 3. FIG. 5 is a cross-sectional view along line V-V in FIG. 3. FIG. 6 is a cross-sectional view along line VI-VI in FIG. 3.

The cylinder SOX has a nozzle attachment seat 57 in addition to the cylinder main body 52 and the outlet flange 55 described above. For example, this nozzle attachment seat 57 is a cylindrical member about the nozzle axis An and is attached to the outer circumferential side of the cylinder main body 52. One end surface of both end surfaces of the nozzle attachment seat 57 (cylindrical member) is a nozzle attachment surface 57p having the secondary fuel nozzle 60 attached thereto. This nozzle attachment surface 57p forms a part on the outer circumferential surface 50o of the cylinder 50X. In addition, a penetration hole 57h of the nozzle attachment seat 57 (cylindrical member) forms a part of the nozzle attachment penetration hole 51. A columnar penetration hole 52h penetrating the cylinder main body 52 from the outer circumferential side thereof to the inner circumferential side is formed in the cylinder main body 52. This penetration hole 52h forms a part of the nozzle attachment penetration hole 51. That is, the nozzle attachment penetration hole 51 according to the present embodiment is constituted of the penetration hole 57h of the nozzle attachment seat 57 and the penetration hole 52h of the cylinder main body 52. A columnar tip portion 60t of the secondary fuel nozzle 60 is inserted into this nozzle attachment penetration hole 51. A nozzle surrounding passage 58 formed along an edge of the nozzle attachment penetration hole 51 around the nozzle attachment penetration hole 51 and allowing cooling air Ac to circulate therethrough is formed in this nozzle attachment seat 57. This nozzle surrounding passage 58 has a circular passage 58a having a circular shape about the nozzle axis An, and a plurality of connection passages 58b. The plurality of connection passages 58b are passages extending in the radial direction with respect to the nozzle axis An and penetrating the nozzle surrounding passage 58 from a space inside the circular passage 58a to a space inside the nozzle attachment penetration hole 51.

As illustrated in FIG. 5, the cylinder main body 52 has an outer plate 53 and an inner plate 54. In a pair of surfaces of the outer plate 53 facing sides opposite to each other, one surface constitutes the outer circumferential surface 50o, and the other surface constitutes a joint surface 53c. In addition, in a pair of surfaces of the inner plate 54 facing sides opposite to each other, one surface constitutes a joint surface 54c, and the other surface constitutes the inner circumferential surface 50i. A plurality of long grooves 53g recessed to the outer circumferential surface 50o side and elongated in a uniform direction are formed on the joint surface 53c of the outer plate 53. Regarding the outer plate 53 and the inner plate 54, the joint surfaces 53c and 54c thereof are joined to each other using brazing or the like. Since the outer plate 53 and the inner plate 54 are joined to each other, openings of the long grooves 53g formed in the outer plate 53 are blocked by the inner plate 54, and the insides of these long grooves 53g become cooling passages 56.

As illustrated in FIGS. 3 and 4, each of the plurality of cooling passages 56 extends in the axial direction Dc. Each of the plurality of cooling passages 56 has an inlet 56i allowing the forced cooling air Acl to flow in, and an outlet 56o allowing this forced cooling air Acl to flow out. In the plurality of cooling passages 56, the plurality of cooling passages 56 disposed on the tip side Dct from the nozzle axis An, having the nozzle surrounding passage 58 present at a tip of itself in an extending direction, and adjacent to each other in the circumferential direction Dcc constitute a plurality of first cooling passages 56a. In addition, in the plurality of cooling passages 56, the plurality of cooling passages 56 disposed on the base end side Dcb from the nozzle axis An, having the nozzle surrounding passage 58 present at a tip of itself in the extending direction, and adjacent to each other in the circumferential direction Dcc constitute a plurality of second cooling passages 56b.

The inlets 56i of these first cooling passages 56a are formed at ends of the first cooling passages 56a on the tip side Dct. These inlets 56i face the cooling air space 75s. Thus, the forced cooling air Acl inside the cooling air space 75s can flow into these first cooling passages 56a. Ends of the first cooling passages 56a on the base end side Dcb are positioned in a region in which the nozzle surrounding passage 58 is present in the axial direction Dc. The outlets 56o of these first cooling passages 56a are formed at ends of these first cooling passages 56a on the base end side Dcb. The outlets 56o of the first cooling passages 56a and the nozzle surrounding passage 58 are connected to each other through first communication passages 59a. This first communication passages 59a extend from the outlets 56o of the first cooling passages 56a toward the radially outward side Dro. Thus, the forced cooling air Acl which has flowed into the first cooling passages 56a can flow into the nozzle surrounding passage 58 through these first communication passages 59a.

Ends of the second cooling passages 56b on the tip side Dct are positioned in a region in which the nozzle surrounding passage 58 is present in the axial direction Dc. The inlets 56i of these second cooling passages 56b are formed at ends of these second cooling passages 56b on the tip side Dct. The inlets 56i of the second cooling passages 56b and the nozzle surrounding passage 58 are connected to each other through second communication passages 59b. These second communication passages 59b extends from the inlets 56i of the second cooling passages 56b toward the radially outward side Dro. Thus, the forced cooling air Acl which has flowed into the nozzle surrounding passage 58 can flow into the second cooling passages 56b through these second communication passages 59b.

In the plurality of second cooling passages 56b, the ends of a part of the second cooling passages 56b on the base end side Deb are positioned in a region in which the acoustic cover 71 is present in the axial direction Dc. The outlets 56o of the part of the second cooling passages 56b are formed at the ends of this part of the second cooling passages 56b on the base end side Dcb. These outlets 56o open from the insides of the second cooling passages 56b toward the radially outward side Dro and face the acoustic space 70s inside the acoustic cover 71. Thus, the forced cooling air Acl which has flowed into this part of the second cooling passages 56b can flow into the acoustic space 70s. The forced cooling air Acl which has flowed into the acoustic space 70s can flow into the combustion space 50s of the cylinder 50X on the inner circumferential side from the acoustic holes 73. In the plurality of second cooling passages 56b, the ends of a different part of the second cooling passages 56b on the base end side Deb are not positioned in a region in which the acoustic cover 71 is present in the axial direction Dc. The outlets 56o of the different part of the second cooling passages 56b are formed at the ends of this different part of the second cooling passages 56b on the base end side Dcb. These outlets 56o open from the insides of the second cooling passages 56b toward the radially inward side Dri and face the combustion space 50s. Thus, the forced cooling air Acl which has flowed into this different part of the second cooling passages 56b can flow into the combustion space 50s. Thus, the forced cooling air Acl which has flowed into all of the second cooling passages 56b can flow into the combustion space 50s.

As described above, since the nozzle attachment seat 57 is attached to the outer circumferential side of the cylinder main body 52, the nozzle surrounding passage 58 formed in this nozzle attachment seat 57 is disposed on the radially outward side Dro from the outlets 56o of the plurality of first cooling passages 56a and the inlets 56i of the plurality of second cooling passages 56b. A cross-sectional area of this nozzle surrounding passage 58 is larger than a cross-sectional area of each of the plurality of first cooling passages 56a and a cross-sectional area of each of the plurality of second cooling passages 56b. For this reason, in the present embodiment, the flow velocity of the forced cooling air Acl flowing in the nozzle surrounding passage 58 can be controlled. Thus, in the present embodiment, a pressure loss of the forced cooling air Acl flowing in the circular nozzle surrounding passage 58 can be curbed.

As illustrated in FIG. 3, the cross-sectional area of the nozzle surrounding passage 58 becomes gradually larger toward positions P2 at both ends of the nozzle surrounding passage 58 in the circumferential direction Dcc from a central portion of the nozzle surrounding passage 58 in the circumferential direction Dcc, namely, positions P1 which are the same positions as the nozzle axis An in the circumferential direction Dcc in the nozzle surrounding passage 58. In other words, the cross-sectional area of the nozzle surrounding passage 58 becomes gradually larger toward positions where the first cooling passages 56a at both ends communicate with the nozzle surrounding passage 58 from a position where the first cooling passage 56a closest to the central portion communicates with the nozzle surrounding passage 58 in the plurality of first cooling passages 56a adjacent to each other. Moreover, the cross-sectional area of the nozzle surrounding passage 58 becomes gradually smaller toward a position where the second cooling passage 56b closest to the central portion communicates with the nozzle surrounding passage 58 from positions where the second cooling passages 56b at both ends communicate with the nozzle surrounding passage 58 in the plurality of second cooling passages 56b adjacent to each other.

Specifically, as illustrated in FIG. 3, a width of the nozzle surrounding passage 58 expands toward the positions P2 at both ends of the nozzle surrounding passage 58 in the circumferential direction Dcc from the positions P1 which are the same positions as the nozzle axis An in the circumferential direction Dcc in the nozzle surrounding passage 58. For this reason, a width W1 at the positions P1 which are the same positions as the nozzle axis An in the circumferential direction Dcc in the nozzle surrounding passage 58 becomes the smallest width of the nozzle surrounding passage 58, and a width W2 at the positions P2 at both ends of the nozzle surrounding passage 58 in the circumferential direction Dcc becomes the largest width of the nozzle surrounding passage 58.

In addition, as illustrated in FIG. 6, a height of the nozzle surrounding passage 58 in the radial direction Dr becomes higher toward the positions P2 at both ends of the nozzle surrounding passage 58 in the circumferential direction Dcc from the positions P1 which are the same positions as the nozzle axis An in the circumferential direction Dcc in the nozzle surrounding passage 58. For this reason, a height H1 at the positions P1 which are the same positions as the nozzle axis An in the circumferential direction Dcc in the nozzle surrounding passage 58 becomes the smallest height of the nozzle surrounding passage 58, and a height H2 at the positions P2 at both ends of the nozzle surrounding passage 58 in the circumferential direction Dcc becomes the largest height of the nozzle surrounding passage 58.

Figure 7:
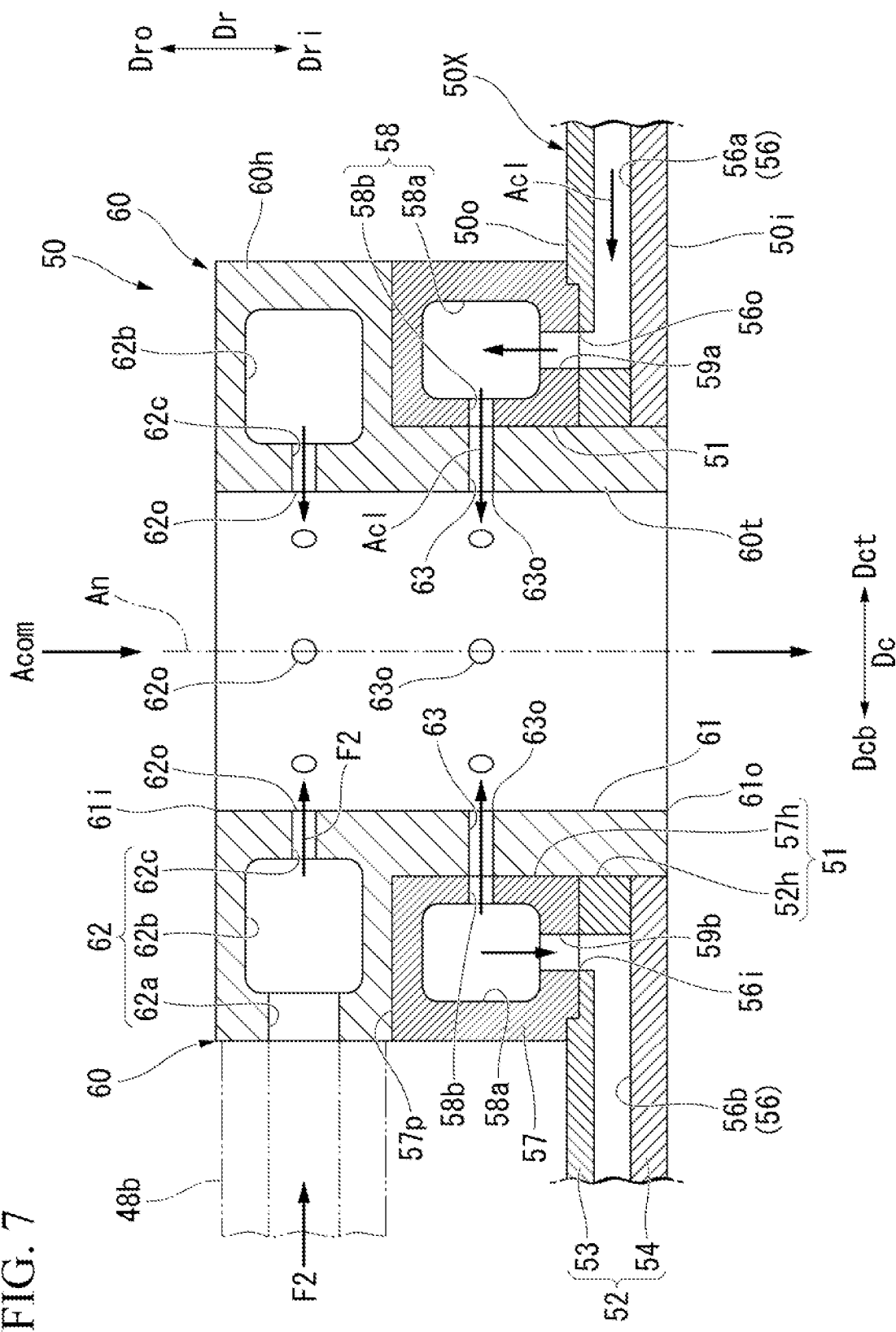
FIG. 7 is a cross-sectional view of a main portion of the combustor cylinder in the embodiment according to the present disclosure.

As illustrated in FIGS. 4 and 7, each of the secondary fuel nozzles 60 has a colunmar head portion 60h and the columnar tip portion 60t. The outer diameter of this tip portion 60t is almost the same as the inner diameter of the nozzle attachment penetration hole 51 such that the columnar tip portion 60t can be inserted into the nozzle attachment penetration hole 51. The outer diameter of the columnar head portion 60h is larger than the inner diameter of the nozzle attachment penetration hole 51.

The secondary fuel nozzle 60 has a mixing passage 61 formed from the head portion 60h to the tip portion 60t, a fuel passage 62 formed in the head portion 60h, and a plurality of connection passages 63 formed in the tip portion 60t.

The mixing passage 61 extends in a direction having a component of the radial direction Dr from the head portion 60h to the tip portion 60t. The mixing passage 61 has a compressed air port 61i capable of guiding the compressed air Acorn present on the outer circumferential side of the cylinder 50X into the mixing passage 61, and a spout port 61o capable of spouting the secondary fuel F2 into the combustion space 50s. The compressed air port 61i is formed at an end of the mixing passage 61 on the radially outward side Dro. The spout port 61o is formed at an end of the mixing passage 61 on the radially inward side Dri.

The fuel passage 62 communicates with the mixing passage 61 and can supply the secondary fuel F2 to the inside of this mixing passage 61. Around the mixing passage 61, this fuel passage 62 has a circular fuel distribution passage 62b about the nozzle axis An a fuel receiving passage 62a communicating with the fuel distribution passage 62b and capable of sending the secondary fuel F2 from the outside to the fuel distribution passage 62b, and a plurality of branch fuel passages 62c communicating with the fuel distribution passage 62b and capable of guiding the secondary fuel F2 from the fuel distribution passage 62b into the mixing passage 61. The fuel receiving passage 62a communicates with the branch secondary fuel pipings 48b which have been described using FIG. 2. Each of the plurality of branch fuel passages 62c has a fuel outlet 62o causing the secondary fuel F2 which has flowed inside the branch fuel passages 62c to flow out to the inside of the mixing passage 61.

The plurality of connection passages 63 communicate with the nozzle surrounding passage 58 and the mixing passage 61 of the cylinder 50X so that the forced cooling air Ac from the nozzle surrounding passage 58 can be supplied to the inside of the mixing passage 61. Specifically, in a state where the secondary fuel nozzles 60 are attached to the cylinder 50X, each of the plurality of connection passages 63 communicates with any of the connection passages 58b of the nozzle surrounding passage 58. Each of the plurality of connection passages 63 has a cooling air outlet 63o causing the forced cooling air Acl to flow out to the inside of the mixing passage 61.

Positions in the mixing passage 61 communicating with the connection passages 63 are on a side where the spout port 61o is present from a position where the mixing passage 61 communicates with the fuel passage 62. Namely, positions in the mixing passage 61 where the cooling air outlets 63o of the connection passages 63 are present are on a side where the spout port 61o is present from positions where the fuel outlets 62o of the fuel passage 62 are present. In the present embodiment, the side where the spout port 61o is present is the radially inward side Dri.

In addition, in the mixing passage 61, the compressed air port 61i is positioned on a side opposite to the spout port 61o based on the position where the fuel passage 62 and the mixing passage 61 communicate with each other. Namely, in the mixing passage 61, the compressed air port 61i is positioned on a side opposite to the spout port 61o based on the fuel outlets 62o of the fuel passage 62. In the present embodiment, a side opposite to the spout port 61o indicates the radially outward side Dro.

Since the fuel passage 62 according to the present embodiment has the plurality of branch fuel passages 62c, the secondary fuel F2 can be supplied to the inside of the mixing passage 61 from a plurality of places. For this reason, in the present embodiment, compared to a case in which the secondary fuel F2 is supplied to the inside of the mixing passage 61 from one place, a uniform fuel concentration distribution inside the mixing passage 61 can be achieved.

The secondary fuel F2 which has flowed into the mixing passage 61 is mixed with the compressed air Acom which has flowed into the mixing passage 61 from the compressed airport 61i. The secondary fuel F2 mixed with the compressed air Acom is spouted to the combustion space 50s inside the cylinder 50X from the spout port 61o of the mixing passage 61. A flow velocity distribution within a cross section of the mixing passage 61 related to a fluid flowing inside this mixing passage 61 is not uniform. At the center of the cross section of the mixing passage 61, the flow velocity becomes the highest in this cross section. On the other hand, the flow velocity inside the mixing passage 61 and in the vicinity of a wall surface defining the mixing passage 61 is almost zero. For this reason, even if the fuel concentration distribution within the cross section of the mixing passage 61 is uniform, there is a probability that the secondary fuel F2 present in the vicinity of the wall surface defining the mixing passage 61 inside the mixing passage 61 will ignite due to an influence of flames or heat inside the combustion space 50s of the cylinder 50X. Namely, there is a probability of occurrence of a flashback phenomenon.

In the present embodiment, on a side where the spout port 61o of the mixing passage 61 is present from a position where the secondary fuel F2 is supplied to the inside of the mixing passage 61, the forced cooling air Acl which has passed through the first cooling passages 56a of the cylinder 50X is supplied through the connection passages 63. For this reason, in the present embodiment, a concentration of the secondary fuel F2 on a side where the spout port 61o of the mixing passage 61 is present from a position where the secondary fuel F2 is supplied to the inside of the mixing passage 61 and in the vicinity of the wall surface defining the mixing passage 61 inside the mixing passage 61 decreases. Therefore, in the present embodiment, occurrence of a flashback phenomenon in which the secondary fuel F2 ignites inside the mixing passage 61 can be cubed.

As above, in the present embodiment, the forced cooling air Acl flows into the first cooling passages 56a from the inlets 56i of the first cooling passages 56a. The forced cooling air Acl cools a part around the first cooling passages 56a of the cylinder 50X during a process of flowing in this first cooling passages 56a. This forced cooling air Acl flows out from the outlets 56o of the first cooling passages 56a. The forced cooling air Acl which has flowed out from the first cooling passages 56a flows into the nozzle surrounding passage 58 formed around the nozzle attachment penetration hole 51. The forced cooling air Acl which has flowed into the nozzle surrounding passage 58 cools a part around the nozzle surrounding passage 58 of the cylinder 50X during a process of flowing in this nozzle surrounding passage 58. The forced cooling air Ac which has flowed into the nozzle surrounding passage 58 flows into the second cooling passages 56b from the inlets 56i of the second cooling passages 56b. The forced cooling air Acl cools a part around the second cooling passages 56b of the cylinder 50X during a process of flowing in these second cooling passages 56b. This forced cooling air Ac flows out from the outlets 56o of the second cooling passages 56b.

Apart around the nozzle attachment penetration hole 51 of the cylinder 50X is cooled by the forced cooling air Acl flowing in the vicinity of the outlets 56o in the first cooling passages 56a, the forced cooling air Ac flowing in the nozzle surrounding passage 58 formed around the nozzle attachment penetration hole 51, and the forced cooling air Ac flowing in the vicinity of the inlets 56i in the second cooling passages 56b.

Thus, in the present embodiment, a part around the nozzle attachment penetration hole 51 having the secondary fuel nozzles 60 attached thereto can be cooled with the forced cooling air Acl. Furthermore, in the present embodiment, the forced cooling air Ac which has flowed in the first cooling passages 56a is guided to the second cooling passages 56b through the nozzle surrounding passage 58. Thus, in the present embodiment, the flow rate of the forced cooling air Acl supplied to the cylinder 50X can be controlled.

As described above, since the flow velocity of the forced cooling air Ac flowing in the nozzle surrounding passage 58 is controlled, a heat transfer coefficient between the forced cooling air Ac flowing in the nozzle surrounding passage 58 and a part around the nozzle surrounding passage 58 of the cylinder 50X becomes lower than a heat transfer coefficient between the forced cooling air Acl flowing in the first cooling passages 56a and a part around the first cooling passages 56a of the cylinder 50X, and a heat transfer coefficient between the forced cooling air Acl flowing in the second cooling passages 56b and a part around the second cooling passages 56b of the cylinder 50X. In other words, the heat transfer coefficient between the forced cooling air Acl flowing in the first cooling passages 56a and a part around the first cooling passages 56a of the cylinder 50X, and the heat transfer coefficient between the forced cooling air Acl flowing in the second cooling passages 56b and a part around the second cooling passages 56b of the cylinder 50X becomes higher than the heat transfer coefficient between the forced cooling air Acl flowing in the nozzle surrounding passage 58 and a part around the nozzle surrounding passage 58 of the cylinder 50X.

Hence, in the present embodiment, the outlet 56o of each of the plurality of first cooling passages 56a and the inlet 56i of each of the plurality of second cooling passages 56b are disposed on the radially inward side Dri from the nozzle surrounding passage 58, and the cooling performance around the nozzle attachment penetration hole 51 of the cylinder 50X and on the inner circumferential surface 50i of the cylinder 50X is enhanced.

As described above, the cross-sectional area of the nozzle surrounding passage 58 becomes gradually larger toward both end portions of the nozzle surrounding passage 58 in the circumferential direction Dcc from the central portion of the nozzle surrounding passage 58 in the circumferential direction Dcc. For this reason, in the present embodiment, even if the forced cooling air Acl flows into the nozzle surrounding passage 58 from the plurality of first cooling passages 56a and the forced cooling air Acl flows out to the insides of the plurality of second cooling passages 56b from this nozzle surrounding passage 58, a uniform flow velocity of the forced cooling air Acl inside the nozzle surrounding passage 58 can be achieved. Thus, in the present embodiment, a pressure loss of the forced cooling air Acl flowing in the nozzle surrounding passage 58 can be curbed. Moreover, in the present embodiment, a uniform heat transfer coefficient between the forced cooling air Acl flowing in the nozzle surrounding passage 58 and apart around the nozzle surrounding passage 58 of the cylinder 50X can be achieved.

Modification Example

The fuel passage 62 of the foregoing embodiment has the fuel receiving passage 62a, the circular fuel distribution passage 62b, and a plurality of branch fuel passages 62c branching from the fuel distribution passage 62b. However, the fuel passages may not have circular distribution passages. In this case, the fuel passages need only have a plurality of passages receiving fuel from the outside and allowing fuel to flow out to the inside of the mixing passage 61.

In the foregoing embodiment, the forced cooling air Acl is used as cooling air. However, the compressed air Acom inside the intermediate casing 14 or air obtained by bleeding and cooling the compressed air Acom inside the intermediate casing 14 may be used as cooling air.

In the foregoing embodiment, the outlets 56o of a part of the second cooling passages 56b open from the insides of the second cooling passages 56b toward the radially outward side Dro and face the acoustic space 70s inside the acoustic cover 71, and the outlets 56o of a different part of the second cooling passages 56b open from the insides of the second cooling passages 56b toward the radially inward side Dri and face the combustion space 50s. However, the outlets 56o of all of the second cooling passages 56b may open from the insides of the second cooling passages 56b toward the radially outward side Dro and face the acoustic space 70s inside the acoustic cover 71. In addition, the outlets 56o of all of the second cooling passages 56b may open from the insides of the second cooling passages 56b toward the radially inward side Dri and face the combustion space 50s.

In the foregoing embodiment, the plurality of first cooling passages 56a and the nozzle surrounding passage 58 are connected to each other through a plurality of first communication passages 59a, and the plurality of second cooling passages 56b and the nozzle surrounding passage 58 are connected to each other through a plurality of second communication passages 59b. However, when the plurality of first cooling passages 56a and the nozzle surrounding passage 58 can be directly connected to each other due to a relative positional relationship between the plurality of first cooling passages 56a and the nozzle surrounding passage 58, the plurality of first communication passages 59a may be omitted. In addition, when the plurality of second cooling passages 56b and the nozzle surrounding passage 58 can be directly connected to each other due to a relative positional relationship between the plurality of second cooling passages 56b and the nozzle surrounding passage 58, the plurality of second communication passages 59b may be omitted.

In the foregoing embodiment, in order to change the cross-sectional area of the nozzle surrounding passage 58 in accordance with the position in the nozzle surrounding passage 58, the width of the nozzle surrounding passage 58 and the height of the nozzle surrounding passage 58 are changed in accordance with the position in the nozzle surrounding passage 58. However, in order to change the cross-sectional area of the nozzle surrounding passage 58 in accordance with the position in the nozzle surrounding passage 58, only one of the width of the nozzle surrounding passage 58 and the height of the nozzle surrounding passage 58 may be changed.

In addition, the present disclosure is not limited to the embodiment and the modification example described above. Various additions, changes, replacements, partial omissions, and the like can be made within a range not departing from the conceptual idea and the gist of the present invention derived from the details and equivalents thereof stipulated in the claims.

APPENDIX

The combustor cylinder 50 according to the embodiment and the modification example described above is ascertained as follows, for example.

(1) A combustor cylinder according to a first aspect includes a cylinder 50X that has a tubular shape around an axis Ac and forms a combustion space 50s allowing fuel F to combust therein on an inner circumferential side, and a fuel nozzle 60 that is attached to the cylinder 50X and is capable of injecting the fuel F2 into the combustion space 50s in a direction having a directional component to a radially inward side Dri with respect to the axis Ac. The cylinder 50X has an inner circumferential surface 50i defining an edge of the combustion space 50s on a radially outward side Dro with respect to the axis Ac, an outer circumferential surface 50o having a back-to-back relationship with the inner circumferential surface 50i, a plurality of cooling passages 56 formed between the inner circumferential surface 50i and the outer circumferential surface 50o and allowing cooling air Acl to circulate therethrough, a nozzle attachment penetration hole 51 penetrating the cylinder 50X from the outer circumferential surface 50o to the inner circumferential surface 50i, and a nozzle surrounding passage 58 formed along an edge of the nozzle attachment penetration hole 51 around the nozzle attachment penetration hole 51 and allowing the cooling air Acl to circulate therethrough. At least a part of the plurality of cooling passages 56 communicates with the nozzle surrounding passage 58. The fuel nozzle 60 is attached to the cylinder 50X while at least a part of the fuel nozzle 60 is inserted through the nozzle attachment penetration hole 51. The fuel nozzle 60 has a mixing passage 61, a fuel passage 62 communicating with the mixing passage 61 and capable of supplying the fuel F2 to the inside of the mixing passage 61, and a connection passage 63 communicating with the nozzle surrounding passage 58 and the mixing passage 61 of the cylinder 50X and capable of supplying the cooling air Ac from the nozzle surrounding passage 58 to the inside of the mixing passage 61. The mixing passage 61 extends in a direction having a component of a radial direction Dr with respect to the axis Ac and has a spout port 61o capable of spouting the fuel F2 into the combustion space 50s. A position in the mixing passage 61 communicating with the connection passage 63 is on a side where the spout port 61o is present from a position where the mixing passage 61 communicates with the fuel passage 62.

The fuel F2 which has flowed into the mixing passage 61 is spouted to the combustion space 50s inside the cylinder 50X from the spout port 61o of the mixing passage 61. A flow velocity distribution within across section of the mixing passage 61 related to a fluid flowing inside this mixing passage 61 is not uniform. At the center of the cross section of the mixing passage 61, the flow velocity becomes the highest in this cross section. On the other hand, the flow velocity inside the mixing passage 61 and in the vicinity of a wall surface defining the mixing passage 61 is almost zero. For this reason, even if a fuel concentration distribution within the cross section of the mixing passage 61 is uniform, there is a probability that the fuel F2 present in the vicinity of the wall surface defining the mixing passage 61 inside the mixing passage 61 will ignite due to an influence of flames or heat inside the combustion space 50s of the cylinder 50X. Namely, there is a probability of occurrence of a flashback phenomenon.

In the present aspect, on a side where the spout port 61o of the mixing passage 61 is present from a position where the fuel F2 is supplied to the inside of the mixing passage 61, the cooling air Acl which has passed through the cooling passages 56 of the cylinder 50X is supplied through the connection passage 63. For this reason, in the present aspect, a concentration of the fuel F2 on a side where the spout port 61o of the mixing passage 61 is present from a position where the fuel F2 is supplied to the inside of the mixing passage 61 and in the vicinity of the wall surface defining the mixing passage 61 inside the mixing passage 61 decreases.

Therefore, in the present aspect, occurrence of a flashback phenomenon in which the fuel F2 ignites inside the mixing passage 61 can be curbed.

(2) Regarding the combustor cylinder according to a second aspect, in the combustor cylinder 50 according to the first aspect, the mixing passage 61 has a compressed air port 61i capable of guiding compressed air Acom present on an outer circumferential side of the cylinder 50X into the mixing passage 61. In the mixing passage 61, the compressed air port 61i is positioned on a side opposite to the spout port 61o based on the position where the fuel passage 62 and the mixing passage 61 communicate with each other.

In the present aspect, the fuel F2 which has flowed into the mixing passage 61 is mixed with the compressed air Acorn which has flowed into the mixing passage 61 from the compressed air port 61i. In the present aspect, the fuel F2 mixed with the compressed air Acorn can be spouted into the combustion space 50s inside the cylinder 50X from the spout port 61o of the mixing passage 61.

(3) Regarding the combustor cylinder according to a third aspect, in the combustor cylinder 50 according to the first aspect or the second aspect, the fuel passage 62 has a circular fuel distribution passage 62b formed around the mixing passage 61, a fuel receiving passage 62a communicating with the fuel distribution passage 62b and capable of sending fuel F2 from the outside to the fuel distribution passage 62b, and a plurality of branch fuel passages 62c communicating with the fuel distribution passage 62b and capable of guiding the fuel F2 from the fuel distribution passage 62b into the mixing passage 61.

In the present aspect since the fuel passage 62 has the plurality of branch fuel passages 62c, the fuel F2 can be supplied to the inside of the mixing passage 61 from a plurality of places. For this reason, in the present aspect, compared to a case in which the fuel F2 is supplied to the inside of the mixing passage 61 from one place, a uniform fuel concentration distribution inside the mixing passage 61 can be achieved.

(4) Regarding the combustor cylinder according to a fourth aspect, in the combustor cylinder 50 according to any one aspect of the first aspect to the third aspect, each of the plurality of cooling passages 56 has an inlet 56i allowing the cooling air Acl to flow in, and an outlet 56o allowing the cooling air Acl to flow out. At least the part of the plurality of cooling passages 56 constitutes a plurality of first cooling passages 56a adjacent to each other and a plurality of second cooling passages 56b adjacent to each other. Each of the plurality of first cooling passages 56a communicates with the nozzle surrounding passage 58 at the outlet 56o thereof. Each of the plurality of second cooling passages 56b communicates with the nozzle surrounding passage 58 at the inlet 56i thereof.

In the present aspect, the cooling air Acl flows inside the nozzle surrounding passage 58 formed around the nozzle attachment penetration hole 51 having the fuel nozzle 60 attached thereto. For this reason, in the present aspect, a part around the nozzle attachment penetration hole 51 having the fuel nozzle 60 attached thereto can be cooled with the cooling air Acl. Furthermore, in the present aspect, the cooling air Acl which has flowed in the first cooling passages 56a is guided to the second cooling passages 56b through the nozzle surrounding passage 58. Thus, in the present aspect, the flow rate of the cooling air Acl supplied to the cylinder 50X can be controlled.

(5) Regarding the combustor cylinder according to a fifth aspect, in the combustor cylinder 50 according to the fourth aspect, a cross-sectional area of the nozzle surrounding passage 58 is larger than a cross-sectional area of each of the plurality of first cooling passages 56a and a cross-sectional area of each of the plurality of second cooling passages 56b. The nozzle surrounding passage 58 is disposed on the radially outward side Dro from the outlet 56o of each of the plurality of first cooling passages 56a and the inlet 56i of each of the plurality of second cooling passages 56b.

In the present aspect, the cross-sectional area of the nozzle surrounding passage 58 is larger than the cross-sectional area of each of the plurality of first cooling passages 56a and the cross-sectional area of each of the plurality of second cooling passages 56b. For this reason, in the present aspect, a pressure loss of the cooling air Acl flowing in the nozzle surrounding passage 58 can be curbed by controlling the flow velocity of the cooling air Acl flowing in the nozzle surrounding passage 58.

Therefore, a heat transfer coefficient between the cooling air Acl flowing in the nozzle surrounding passage 58 and a part around the nozzle surrounding passage 58 of the cylinder 50X becomes lower than a heat transfer coefficient between the cooling air Acl flowing in the first cooling passages 56a and a part around the first cooling passages 56a of the cylinder 50X, and a heat transfer coefficient between the cooling air Acl flowing in the second cooling passages 56b and a part around the second cooling passages 56b of the cylinder 50X. In other words, the heat transfer coefficient between the cooling air Acl flowing in the first cooling passages 56a and a part around the first cooling passages 56a of the cylinder 50X, and the heat transfer coefficient between the cooling air Acl flowing in the second cooling passages 56b and a part around the second cooling passages 56b of the cylinder 50X becomes higher than the heat transfer coefficient between the cooling air Ac flowing in the nozzle surrounding passage 58 and a part around the nozzle surrounding passage 58 of the cylinder 50X.

Hence, in the present aspect, the outlet 56o of each of the plurality of first cooling passages 56a and the inlet 56i of each of the plurality of second cooling passages 56b are disposed on the radially inward side Dri from the nozzle surrounding passage 58, and the cooling performance around the nozzle attachment penetration hole 51 of the cylinder 50X and on the inner circumferential surface 50i of the cylinder 50X is enhanced.

(6) Regarding the combustor cylinder according to a sixth aspect, in the combustor cylinder 50 according to the fourth aspect or the fifth aspect, a cross-sectional area of the nozzle surrounding passage 58 becomes gradually larger toward a position where the first cooling passages 56a at both ends communicate with the nozzle surrounding passage 58 from a position where the first cooling passage 56a, of the plurality of first cooling passages 56a adjacent to each other, closest to a central portion communicates with the nozzle surrounding passage 58. Moreover, the cross-sectional area of the nozzle surrounding passage 58 becomes gradually smaller toward a position where the second cooling passages 56b closest to the central portion communicates with the nozzle surrounding passage 58 from a position where the second cooling passages 56b, of the plurality of second cooling passages 56b adjacent to each other, at both ends communicate with the nozzle surrounding passage 58.

In the present aspect, even if the cooling air Acl flows into the nozzle surrounding passage 58 from the plurality of first cooling passages 56a and the cooling air Acl flows out to the inside of the plurality of second cooling passages 56b from this nozzle surrounding passage 58, a uniform flow velocity of the cooling air Acl inside the nozzle surrounding passage 58 can be achieved. For this reason, in the present aspect, a pressure loss of the cooling air Acl flowing in the nozzle surrounding passage 58 can be curbed. Moreover, in the present aspect, a uniform heat transfer coefficient between the cooling air Ac flowing in the nozzle surrounding passage 58 and a part around the nozzle surrounding passage 58 of the cylinder 50X can be achieved.

(7) Regarding the combustor cylinder according to a seventh aspect, in the combustor cylinder 50 according to any one aspect of the fourth aspect to the sixth aspect, the plurality of first cooling passages 56a extend in an axial direction Dc along the axis Ac and are arranged in a circumferential direction Dcc with respect to the axis Ac. In the plurality of first cooling passages 56a, the outlet 56o is formed at an end on a base end side Deb of a tip side Dt and the base end side Dcb in the axial direction Dc. The plurality of second cooling passages 56b extend in the axial direction Dc, are arranged in the circumferential direction Dcc, and are disposed on the base end side Dcb from the plurality of first cooling passages 56a. In the plurality of second cooling passages 56b, the inlet 56i is formed at an end on the tip side Dct.

(8) Regarding the combustor cylinder according to an eighth aspect, in the combustor cylinder 50 according to the seventh aspect, a cross-sectional area of the nozzle surrounding passage 58 becomes gradually larger toward both end portions of the nozzle surrounding passage 58 in the circumferential direction Dcc from a central portion of the nozzle surrounding passage 58 in the circumferential direction Dcc.

In the present aspect, even if the cooling air Ac flows into the nozzle surrounding passage 58 from the plurality of first cooling passages 56a and the cooling air Ac flows out to the inside of the plurality of second cooling passages 56b from this nozzle surrounding passage 58, a uniform flow velocity of the cooling air Ac inside the nozzle surrounding passage 58 can be achieved. For this reason, in the present aspect, a pressure loss of the cooling air Ac flowing in the nozzle surrounding passage 58 can be curbed. Moreover, in the present aspect, a uniform heat transfer coefficient between the cooling air Acl flowing in the nozzle surrounding passage 58 and a part around the nozzle surrounding passage 58 of the cylinder 50X can be achieved.

(9) Regarding the combustor cylinder according to a ninth aspect, in the combustor cylinder 50 according to the eighth aspect, a height of the nozzle surrounding passage 58 in the radial direction Dr with respect to the axis Ac becomes gradually higher toward both end portions of the nozzle surrounding passage 58 in the circumferential direction Dcc from the central portion of the nozzle surrounding passage 58 in the circumferential direction Dcc.

A combustor 40 according to the embodiment and the modification example described above is ascertained as follows, for example.

(10) A combustor according to a tenth aspect includes the combustor cylinder 50 according to any one aspect of the first aspect to the ninth aspect, and a primary fuel nozzle 47 that is capable of injecting primary fuel F1 in a direction having a directional component to a tip side Dct of the tip side Dct and a base end side Deb in an axial direction Dc along the axis Ac inside the cylinder 50X. The fuel nozzle 60 of the combustor cylinder 50 is a secondary fuel nozzle capable of injecting secondary fuel F2.

A gas turbine 10 according to the embodiment and the modification example described above is ascertained as follows, for example.

(11) A gas turbine according to an eleventh aspect includes the combustor 40 according to the tenth aspect, a compressor 20 that is able to generate compressed air Acom used for combustion of fuel inside the cylinder 50X by compressing air A. and a turbine 30 that is able to be driven by means of combustion gas G generated due to combustion of fuel inside the cylinder 50X

EXPLANATION OF REFERENCES

10 Gas turbine
11 Gas turbine rotor
14 Intermediate casing
14h Combustor attachment hole
15 Gas turbine casing
16 Forced cooling facility
17 Cooling air line
17e Bleeding line
17m Cooling air main line
17b Cooling air branch line
18 Cooler
19 Boost compressor
20 Compressor
21 Compressor rotor
22 Rotor shaft
23 Turbine blade cascade
25 Compressor casing
26 Turbine vane cascade
30 Turbine
31 Turbine rotor
32 Rotor shaft
33 Turbine blade cascade
35 Turbine casing
36 Turbine vane cascade
39 Combustion gas flow channel
40 Combustor
41 Flange
42 Bolt
43 Combustor basket
44 Cylinder support
45 Fuel line
46 Primary fuel piping
46p Pilot fuel piping
46m Main fuel piping
47 Primary fuel nozzle
47p Pilot nozzle
47m Main nozzle
48 Secondary fuel piping
48b Branched secondary fuel piping
48m Fuel manifold
50 Combustor cylinder (combustor liner or transition piece)
50X Cylinder
50i Inner circumferential surface
50o Outer circumferential surface
50s Combustion space
51 Nozzle attachment penetration hole
52 Cylinder main body
52h Penetration hole
53 Outer plate
53c Joint surface
53g Long groove
54 Inner plate
54c Joint surface
55 Outlet flange
56 Cooling passage
56a First cooling passage
56b Second cooling passage
56i Inlet
56o Outlet
57 Nozzle attachment seat
57h Penetration hole
57p Nozzle attachment surface
58 Nozzle surrounding passage
58a Circular passage
58b Connection passage
59a First communication passage
59b Second communication passage
60 Secondary fuel nozzle (or simply, fuel nozzle)
60h Head portion
60t Tip portion
61 Mixing passage
61i Compressed air port
61o Spout
62 Fuel passage
62a Fuel receiving passage
62b Fuel distribution passage
62c Branched fuel passage
62o Fuel outlet
63 Connection passage
63o Cooling air outlet
70 Acoustic attenuator
70s Acoustic space
71 Acoustic cover
73 Acoustic hole
75 Cooling air jacket
75s Cooling air space
A Outside air (or simply, air)
Acom Compressed air
Acl Forced cooling air (or simply, air)
F Fuel
F1 Primary fuel
F2 Secondary fuel
G Combustion gas
Ar Rotor axis
Ac Combustor axis (or simply, axis)
An Nozzle axis
Da Rotor axis direction
Dau Axis upstream side
Dad Axis downstream side
Dc Axial direction
Dcb Base end side
Dct Tip side
Dce Circumferential direction
Dr Radial direction
Dri Radially inward side
Dro Radially outward side

What is claimed is:

1. A combustor cylinder comprising:
a cylinder that has a tubular shape around an axis and forms a combustion space allowing fuel to combust therein on an inner circumferential side; and
a fuel nozzle that is attached to the cylinder and is capable of injecting the fuel into the combustion space in a direction having a directional component to a radially inward side with respect to the axis,
wherein the cylinder has
an inner circumferential surface defining an edge of the combustion space on a radially outward side with respect to the axis,
an outer circumferential surface having a back-to-back relationship with the inner circumferential surface,
a plurality of cooling passages formed between the inner circumferential surface and the outer circumferential surface and allowing cooling air to circulate therethrough, a nozzle attachment penetration hole penetrating the cylinder from the outer circumferential surface to the inner circumferential surface, and
a nozzle surrounding passage formed along an edge of the nozzle attachment penetration hole around the nozzle attachment penetration hole and allowing the cooling air to circulate therethrough,
wherein at least a part of the plurality of cooling passages communicates with the nozzle surrounding passage,
wherein the fuel nozzle is attached to the cylinder while at least a part of the fuel nozzle is inserted through the nozzle attachment penetration hole,
wherein the fuel nozzle has a mixing passage, a fuel passage communicating with the mixing passage and capable of supplying the fuel to inside of the mixing passage, and a connection passage communicating with the nozzle surrounding passage and the mixing passage and capable of supplying the cooling air from the nozzle surrounding passage to the inside of the mixing passage,
wherein the mixing passage extends in a direction having a component of a radial direction with respect to the axis and has a spout port capable of spouting the fuel into the combustion space, and
wherein a position in the mixing passage communicating with the connection passage is on a side where the spout port is present from a position where the mixing passage communicates with the fuel passage.

2. The combustor cylinder according to claim 1,
wherein the mixing passage has a compressed air port capable of guiding compressed air present on an outer circumferential side of the cylinder into the mixing passage, and
wherein in the mixing passage, the compressed air port is positioned on a side opposite to the spout port based on the position where the fuel passage and the mixing passage communicate with each other.

3. The combustor cylinder according to claim 1,
wherein the fuel passage has a circular fuel distribution passage formed around the mixing passage, a fuel receiving passage communicating with the fuel distribution passage and capable of sending the fuel from outside to the fuel distribution passage, and a plurality of branch fuel passages communicating with the fuel distribution passage and capable of guiding the fuel from the fuel distribution passage into the mixing passage.

4. The combustor cylinder according to claim 1,
wherein each of the plurality of cooling passages has an inlet allowing the cooling air to flow in, and an outlet allowing the cooling air to flow out,
wherein at least the part of the plurality of cooling passages constitutes a plurality of first cooling passages adjacent to each other and a plurality of second cooling passages adjacent to each other,
wherein each of the plurality of first cooling passages communicates with the nozzle surrounding passage at the outlet thereof, and
wherein each of the plurality of second cooling passages communicates with the nozzle surrounding passage at the inlet thereof.

5. The combustor cylinder according to claim 4,
wherein a cross-sectional area of the nozzle surrounding passage is larger than a cross-sectional area of each of the plurality of first cooling passages and a cross-sectional area of each of the plurality of second cooling passages, and wherein the nozzle surrounding passage is disposed on the radially outward side from the outlet of each of the plurality of first cooling passages and the inlet of each of the plurality of second cooling passages.

6. The combustor cylinder according to claim 4,
wherein a cross-sectional area of the nozzle surrounding passage becomes gradually larger toward a position where the first cooling passages at both ends, of the plurality of first cooling passages adjacent to each other, communicate with the nozzle surrounding passage from a position where the first cooling passage, of the plurality of first cooling passages adjacent to each other, closest to a central portion communicates with the nozzle surrounding passage, and
wherein moreover, the cross-sectional area of the nozzle surrounding passage becomes gradually smaller toward a position where the second cooling passage, of the plurality of second cooling passages adjacent to each other, closest to the central portion communicates with the nozzle surrounding passage from a position where the second cooling passages, of the plurality of second cooling passages adjacent to each other, at both ends communicate with the nozzle surrounding passage.

7. The combustor cylinder according to claim 4,
wherein the plurality of first cooling passages extend in an axial direction along the axis and are arranged in a circumferential direction with respect to the axis,
wherein in the plurality of first cooling passages, the outlet is formed at an end on a base end side in the axial direction,
wherein the plurality of second cooling passages extend in the axial direction, are arranged in the circumferential direction, and are disposed on the base end side from the plurality of first cooling passages, and
wherein in the plurality of second cooling passages, the inlet is formed at an end on the a tip side in the axial direction.

8. The combustor cylinder according to claim 7,
wherein a cross-sectional area of the nozzle surrounding passage becomes gradually larger toward both end portions of the nozzle surrounding passage in the circumferential direction from a central portion of the nozzle surrounding passage in the circumferential direction.

9. The combustor cylinder according to claim 8,
wherein a height of the nozzle surrounding passage in the radial direction with respect to the axis becomes gradually higher toward both end portions of the nozzle surrounding passage in the circumferential direction from the central portion of the nozzle surrounding passage in the circumferential direction.

10. A combustor comprising:
the combustor cylinder according to claim 1; and
a primary fuel nozzle that is capable of injecting primary fuel in a direction having a directional component to a tip side in the axial direction and a base end side in an axial direction along the axis inside the cylinder,
wherein the fuel nozzle of the combustor cylinder is a secondary fuel nozzle capable of injecting secondary fuel.

11. A gas turbine comprising:
the combustor according to claim 10;
a compressor that is able to generate compressed air used for combustion of fuel inside the cylinder by compressing air; and a turbine that is able to be driven by means of combustion gas generated due to combustion of fuel inside the cylinder.

\* \* \* \* \*